United States Patent [19]
Ro

[11] Patent Number: 5,325,469
[45] Date of Patent: Jun. 28, 1994

[54] GRAPHIC EMULATION METHOD IN A PRINTER

[76] Inventor: Ji-Ho Ro, 16-88, Boolkwang-dong, Eunpyeong-ku, Seoul, Rep. of Korea

[21] Appl. No.: 998,024

[22] Filed: Dec. 29, 1992

[30] Foreign Application Priority Data

Nov. 21, 1992 [KR] Rep. of Korea ............... 1992/21970

[51] Int. Cl.⁵ ........................................... G06K 15/00
[52] U.S. Cl. .................................... 395/115; 395/116
[58] Field of Search ............... 395/101, 103, 114, 112, 395/115, 116, 140, 108, 164–166, 500; 346/154; 358/404, 444

[56] References Cited

U.S. PATENT DOCUMENTS

4,992,958  2/1991  Kageyama et al. ................. 395/116
5,125,072  6/1992  Ng ....................................... 395/112
5,136,688  8/1992  Morikawa et al. .................. 395/115

*Primary Examiner*—Arthur G. Evans

[57] ABSTRACT

In a graphic processing method in a dot matrix printer, a previous graphic mode and a previous position value of an image data are respectively compared with a current graphic mode and a current position value of an image data. If the previous and current graphic modes and position values are identical to each other, an overwrite flag is set to on, and if the previous and current position values are not identical to each other and a value obtained by subtracting the previous position value from the current position value is within a space fill-in region, space fill-in process is performed. Thereafter, the current position value is replaced to the previous position value when the value is not within the space fill-in region or the space fill-in process is ended, and a pin number is initialized. Then an image data with respect to a corresponding pin is generated, and whether or not the overwrite flag is set to on is checked. If the overwrite flag is set to on, a current image data is overwritten to a previous image data of corresponding pin number and if the overwrite flag is not set to on, the current image data is inserted to the symbolic buffer.

2 Claims, 8 Drawing Sheets

GRAPHIC EMULATION METHOD IN A PRINTER

BACKGROUND OF THE INVENTION

The present invention relates to a graphic emulation method in a printer, and more particularly to a dot matrix printing graphic emulation method in a page printer adopting band buffering system.

Generally, inputted image data for use in a dot matrix printer is directly used to image data for use in a page printer without being filtering in the page printer.

Figure 1:
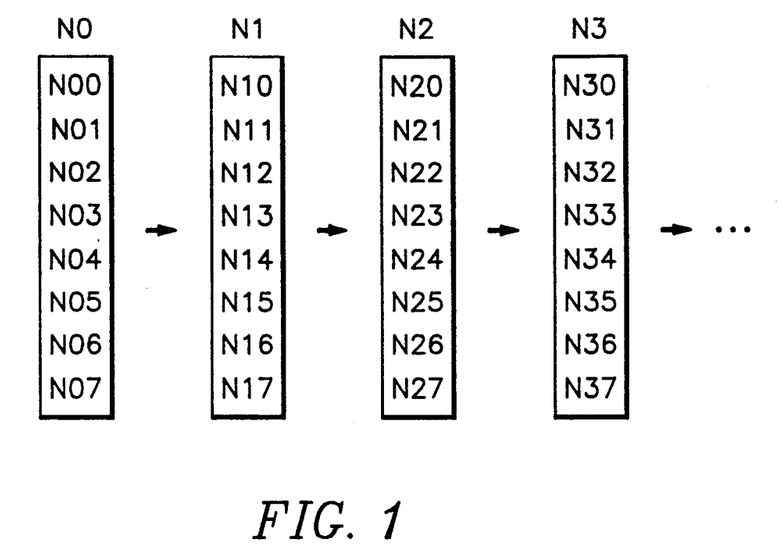
FIG. 1 shows a method forming printing fonts of graphic image data in an 8-pin dot matrix printer.
Figure 2:
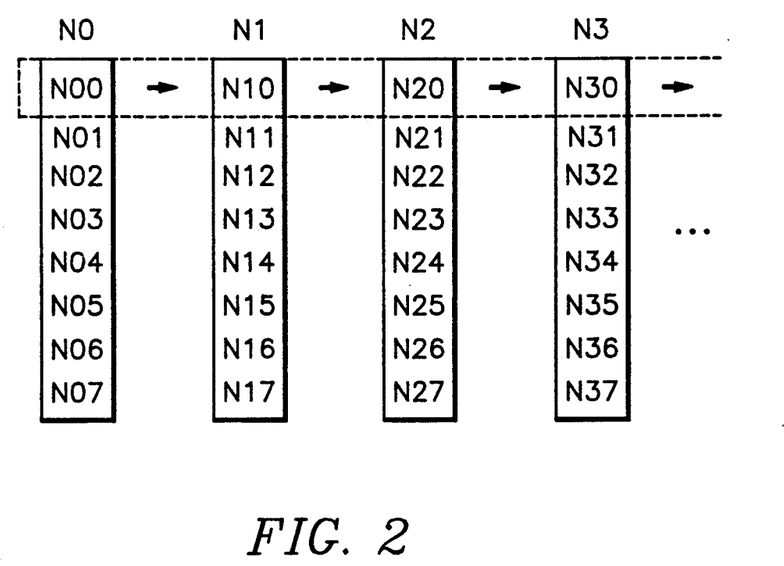
FIG. 2 shows a scanning method of 8-pin graphic image data in a page printer.
Figure 3:
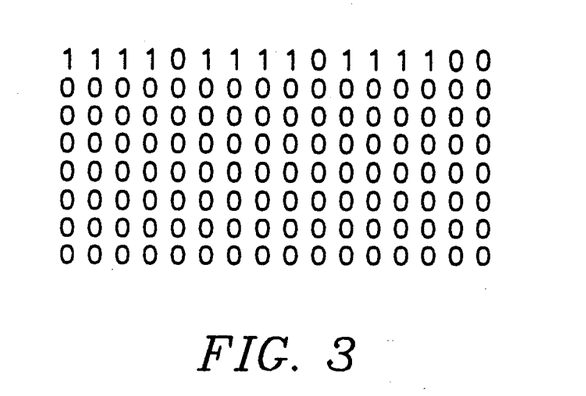
FIG. 3 shows a forming method of line segments from the 8-pin graphic image data.
Figure 4:
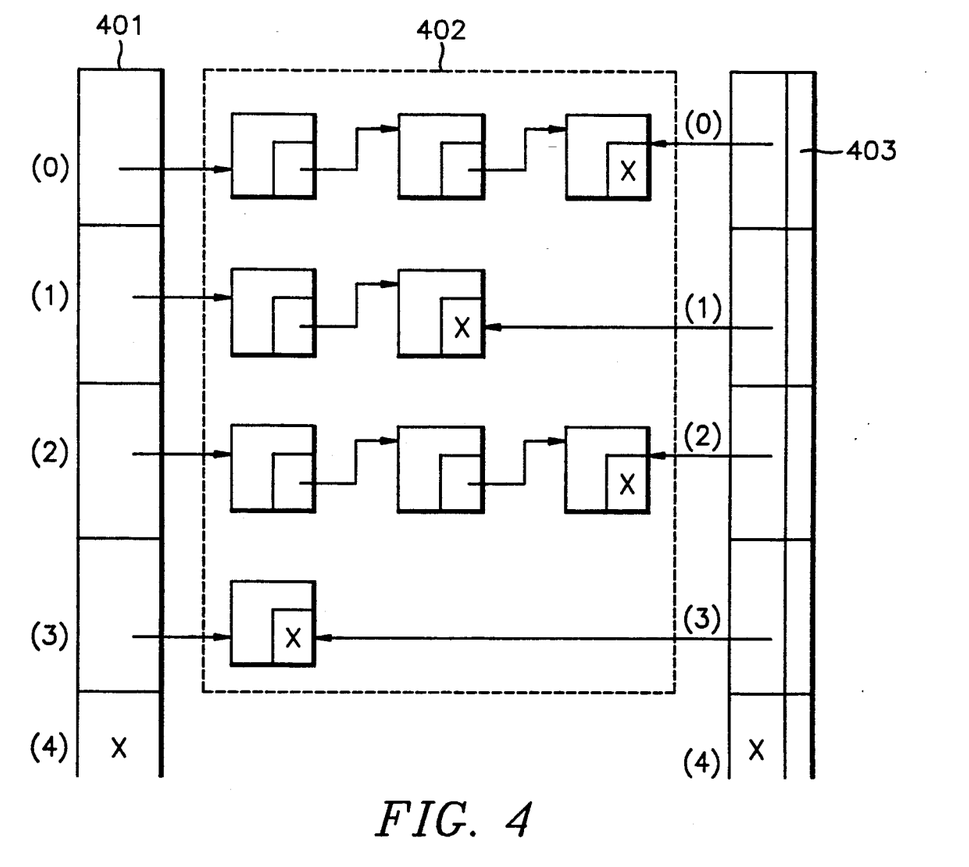
FIG. 4 shows the structure of a symbolic buffer.

FIG. 1 shows a method forming printing fonts of the image data in an 8-pin dot matrix printer. In order to form printing fonts of the dot matrix image data by the unit of line in the page printer, the position of bits of the dot matrix image data is checked as shown in FIG. 2. Then dots having a value of "1" are connected to form line segments as indicated in FIG. 3. The line segments are stored to a frame buffer in a full buffering system. The full buffering system sets data of the unit of page to a memory in the form of 2-dimensional array. The memory stores character image data, graphic image data, etc. in response to control commands in the printer and transmits the contents of the buffer to an engine by page output control command. In the band buffering system, the line segments are stored to a symbolic buffer 402 of FIG. 4. The symbolic buffer 402 generally has a linked list shape as shown in FIG. 4.

Figure 5:
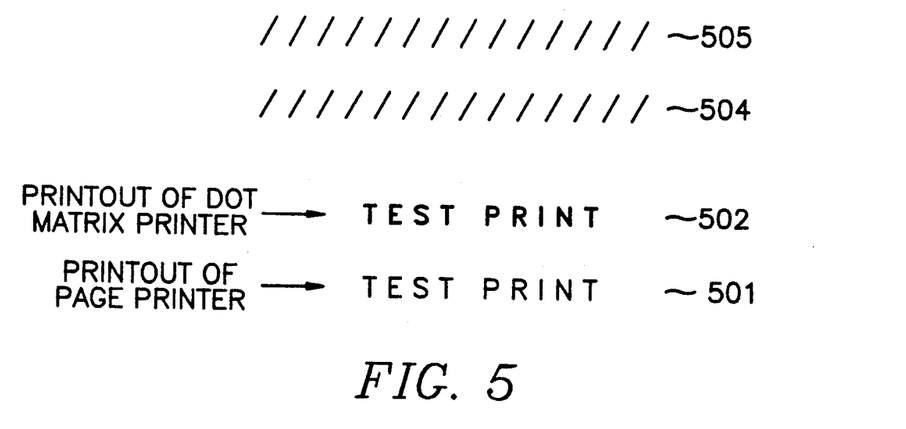
FIG. 5 shows graphic image data input forms in the case of overwriting in a dot matrix printer and the outputs in the dot matrix printer and page printer obtained by the graphic image data input.

However, since there is no filtering processes in receiving the image data regardless of the image data form, when overwriting, space fill-in, etc. are used to obtain a clear image in a dot matrix printer, various ineffective aspects occur in converting to a different printing method. When performing the overwriting in the dot matrix printer, if the control input is "TEST PRINT", bold image is obtained by repeatedly printing the printing fonts onto the same position as shown in FIG. 5 however, in the case of the page printer incapable of controlling the difference of density of dots (that is, whether a dot is printed or not), since the overwriting is not implemented, the processing time is delayed and the memory space wastes.

Figure 6A:
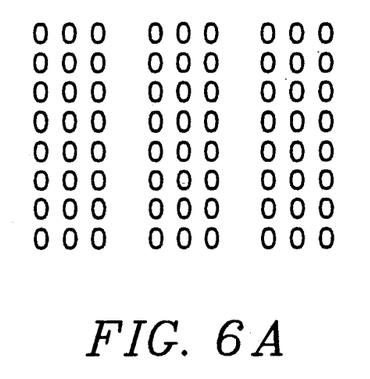
FIGS. 6A to 6C show an example for performing space fill-in in a dot matrix printer.
Figure 6B:
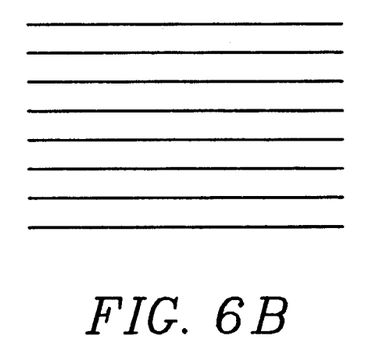
Figure 6C:
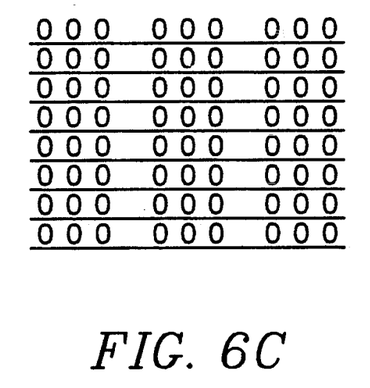

As shown in FIG. 6C, the space fill-in using image data of FIG. 6A and the image data line-fed by 0.5 dots of FIG. 6B is performed in the dot matrix printer to compensate the degradation of picture quality generated by the interval between mechanically designed vertical pins. However, from the emulation method in the conventional page printer, the line segments having the same thickness are generated every interval, and as a result, the space fill-in has no effect on the picture quality and leads to the delay of the processing time.

SUMMARY OF THE INVENTION

It is therefore an object of the present invention to provide a method for saving memory space and shortening processing time in a page printer adopting the band buffering system.

It is another object of the present invention to provide a method for efficiently achieving overwriting, space fill-in, etc. in processing data for use in a dot matrix printer in a page printer.

In accordance with one aspect of the present invention, a graphic processing method in a dot matrix printer comprises the steps of: comparing a previous graphic mode and a previous position value of an image data with a current graphic mode and a current position value of an image data, respectively; if the previous and current graphic modes and position values are identical to each other, setting an overwrite flag to on, and if the previous and current position values are not identical to each other and a value obtained by subtracting the previous position value from the current position value is within a space fill-in region, performing space fill-in; replacing the current position value to the previous position value when the value is not within the space fill-in region or the space fill-in process is ended, and initializing a pin number; and generating an image data with respect to a corresponding pin, checking the overwrite flag is set to on, overwriting a current image data to a previous image data of corresponding pin number when the overwrite flag is set to on, and inserting the current image data to the symbolic buffer when the overwrite flag is not set to on.

Further, the image data overwriting process comprises the steps of: checking if the image data can be overwritten to the previous image data, inserting the current image data to the symbolic buffer when the image data can not be overwritten, and removing an item indicated by the previous image data of a corresponding pin number from the symbolic buffer when the image data can be overwritten; overwriting the image data of the removed item to the current image data and re-forming an item to be inserted to the symbolic buffer; and returning the removed item to a free memory pool and inserting the re-formed item to the symbolic buffer.

BRIEF DESCRIPTION OF THE DRAWINGS

For a better understanding of the present invention, reference will now be made, by way of example only, to the accompanying diagrammatic drawings, in which.

DETAILED DESCRIPTION OF THE PREFERRED EMBODIMENT

Figure 7:
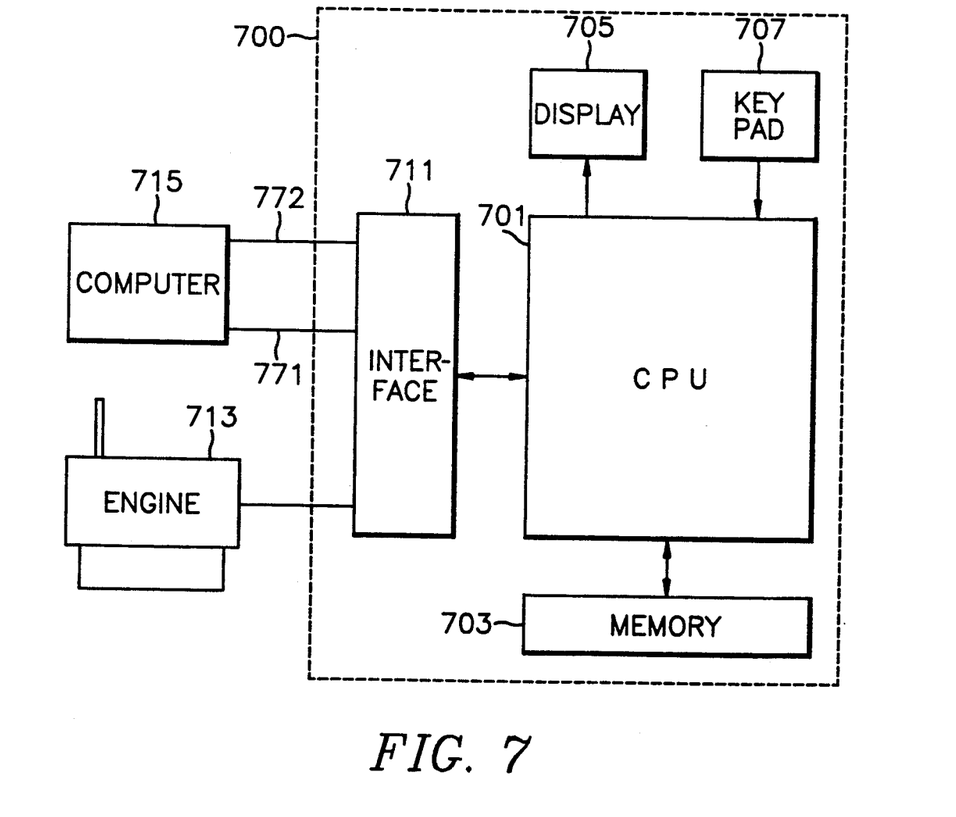
FIG. 7 is a block diagram of a general page printer applied to the present invention.

Referring to FIG. 7, a page printer system applied to the present invention has an engine 713 for printing the image, a controller 700 for controlling the engine 713, and a computer 715 for transferring various files to the controller 700. The controller 700 includes a central processing unit (CPU) 701 for controlling the whole part, an interface 711 for communicating with the engine 713 and the computer 715 through serial and parallel ports 771 and 772, a key pad 707, a display 705, and a memory 703 for storing data. The memory 703 is divided into a ROM in which a program code is provided and a RAM to which data is stored when the system is operating. The program code consists of a kernel part for managing the whole resource of the controller 700 and an emulation program part for analyzing various printer control commands by the use of interface functions provided by the kernel part. Generally, the kernel part is positioned in the ROM and the emulation program part is provided in the form of cartridge in order to correspond to the various printer commands and a user's request.

The emulation method for implementing an image data for use in the dot matrix printer to the page printer provides a filtering function so as to have the effect of the overwriting, space fill-in. etc. employed to improve the picture quality in the dot matrix printer.

Figure 8A:
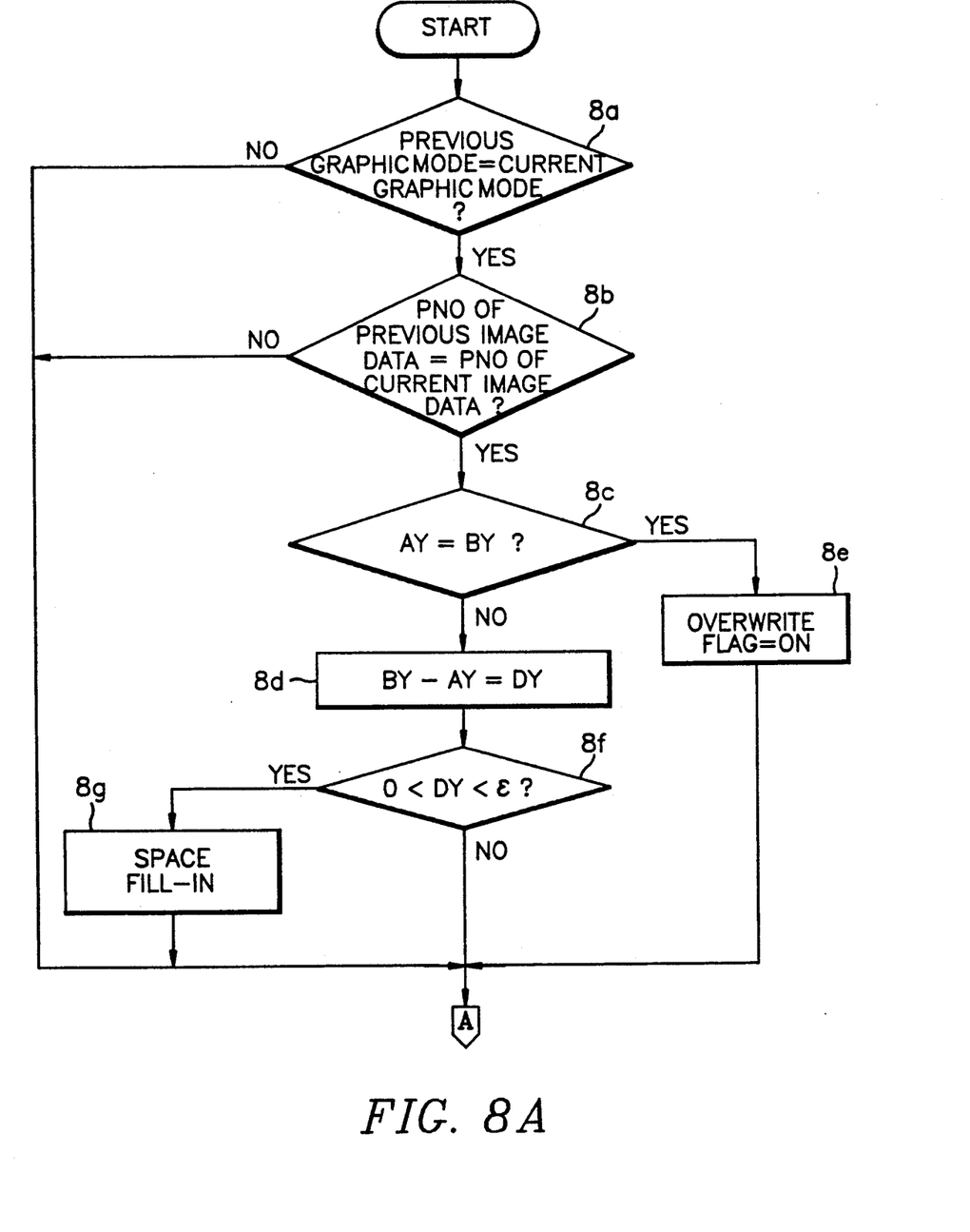
FIG. 8A to 8B are a flow chart of a series of steps for processing overwriting and space fill-in in a dot matrix printer so as to be used in a page printer according to the present invention.
Figure 8B:
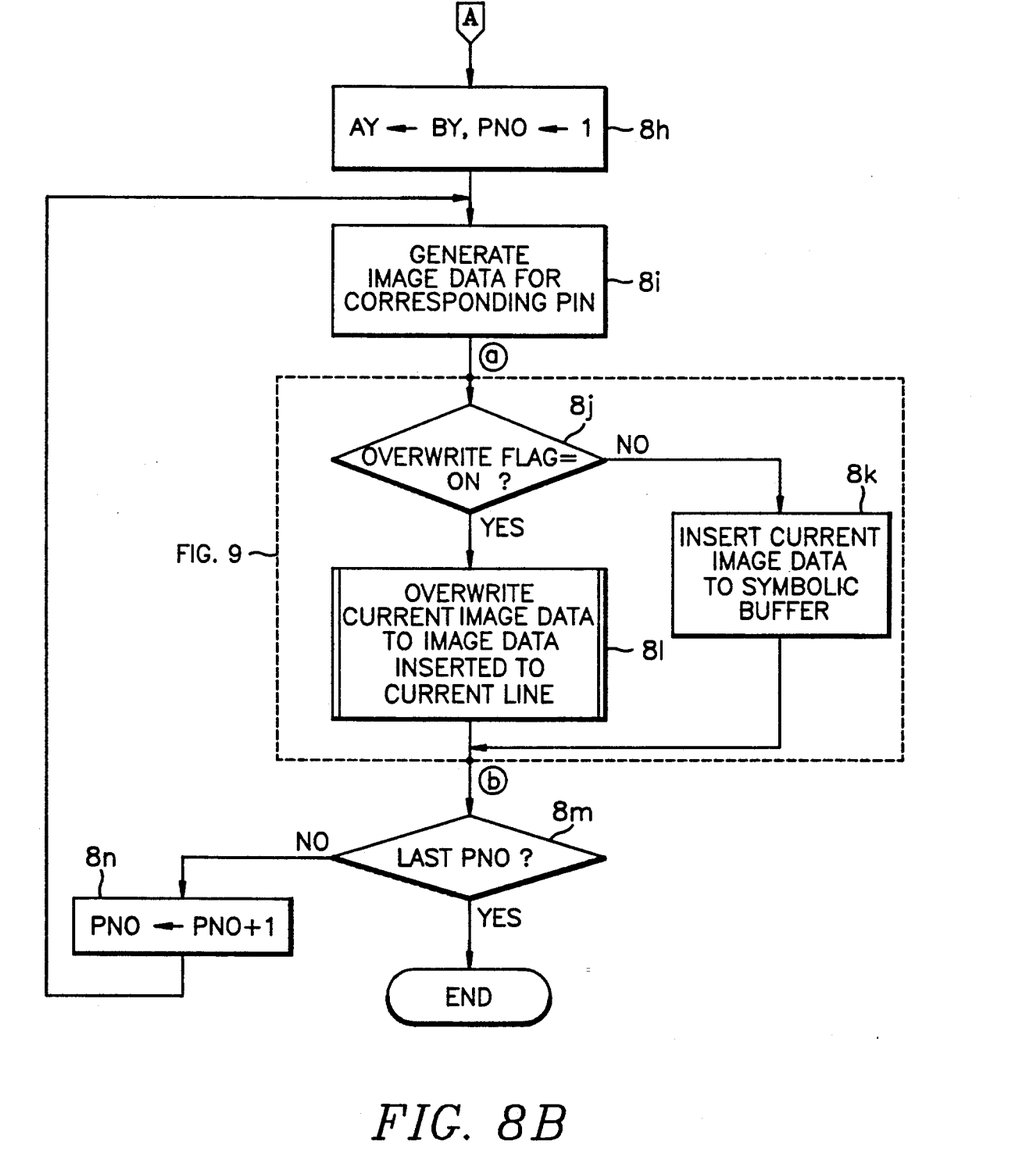

Referring to FIG. 8, in step 8a, the CPU 701 compares a previous graphic mode with a current graphic mode. That is, since data in other forms is transmitted, depending on the resolution of an image data in any printer, and particularly in the page printer, data having low resolution is magnified in printing after compressed and stored, if the graphic modes are not identical to each other, the overwriting is not implemented. In step 8b, whether or not the pin number PNO of a previous image data is equal to that of a current image data is checked. If the pin number PNO is not identical to each other, the overwriting is not performed. In step 8c, a position value of previous image data AY is checked to see if it is the same with a position value of current image data BY. If the position values are same with one another, step 8c proceeds to step 8e to set an overwrite flag to "on" state. If the position values are not identical to each other, the previous position value AY is subtracted from the current position value BY to obtain a value DY, in step 8d. In step 8f, whether or not the value DY is between 0 and a space fill-in region $\epsilon$ is checked. The region e has various values depending on the head shape of the dot matrix printer, and the size is basically determined by one-half times the distance between pins of the head. For example, in a 9-pin dot matrix printer, the distance between pins is 1/75 inches, and in this case, line feeding of 1/150 inches or less is implemented. If the value DY is within the space fill-in region $\epsilon$, step 8f advances step 8g to perform the space fill-in.

In the page printer, when printing raster image data of one line, the thickness of the image data (a Y axis) is designated. In emulation method in the conventional dot matrix printer, the thickness of one line is determined by the distance between pins of the head. In the case of 300 DPI (dots per inch) page printer, when emulating the data for use in 240 DPI dot matrix printer, the distance between pins is 4.2 dots and one dot in the image data in the dot matrix printer is magnified by 5 dots, vertically, corresponding to an integer value of 4.2 dots. In step 8g, the printing is performed after feeding one-half the distance between pins of the dot matrix printer.

Consequently, in the space fill-in, the position of the previously processed graphic image data is stored to the buffer and even if the thickness of a corresponding line is reduced to 3 dots when data is again applied after feeding one-half distance between pins, the interval up to a next line can be filled. Therefore, in the page printer adopting band buffering system, the processing time can be shortened and the efficiency increased.

In step 8h, the current position value BY is replaced to the previous position value AY to be used in a next check, and the pin number PNO used as an index of a pin is initialized to 1. Thereafter, in step 8i, an image data for a corresponding pin is generated. That is, while scanning the image data in the dot matrix printer, line segments are produced by connecting dots adjacent to each other and the line segments are appended to the buffer to which image data is stored. In the following step 8j, whether or not the overwrite flag is set to "on" is checked. If the overwrite flag is "on" state, step 8j advances to step 8l to overwrite the current image data to the image data which is inserted to a current line. The overwriting operation will be described with reference to the flow chart of FIG. 9. If the overwrite flag is "off" state, in step 8k, the current image data is inserted to the symbolic buffer and simultaneously the inserted position is stored to the printer buffer to which the previous image data is stored so as to be used in a next line process. Next, in step 8m, whether or not all the pins are processed is checked. If all the pins are not processed, step 8m is followed by step 8n to increment the pin number PNO by 1.

Figure 9:
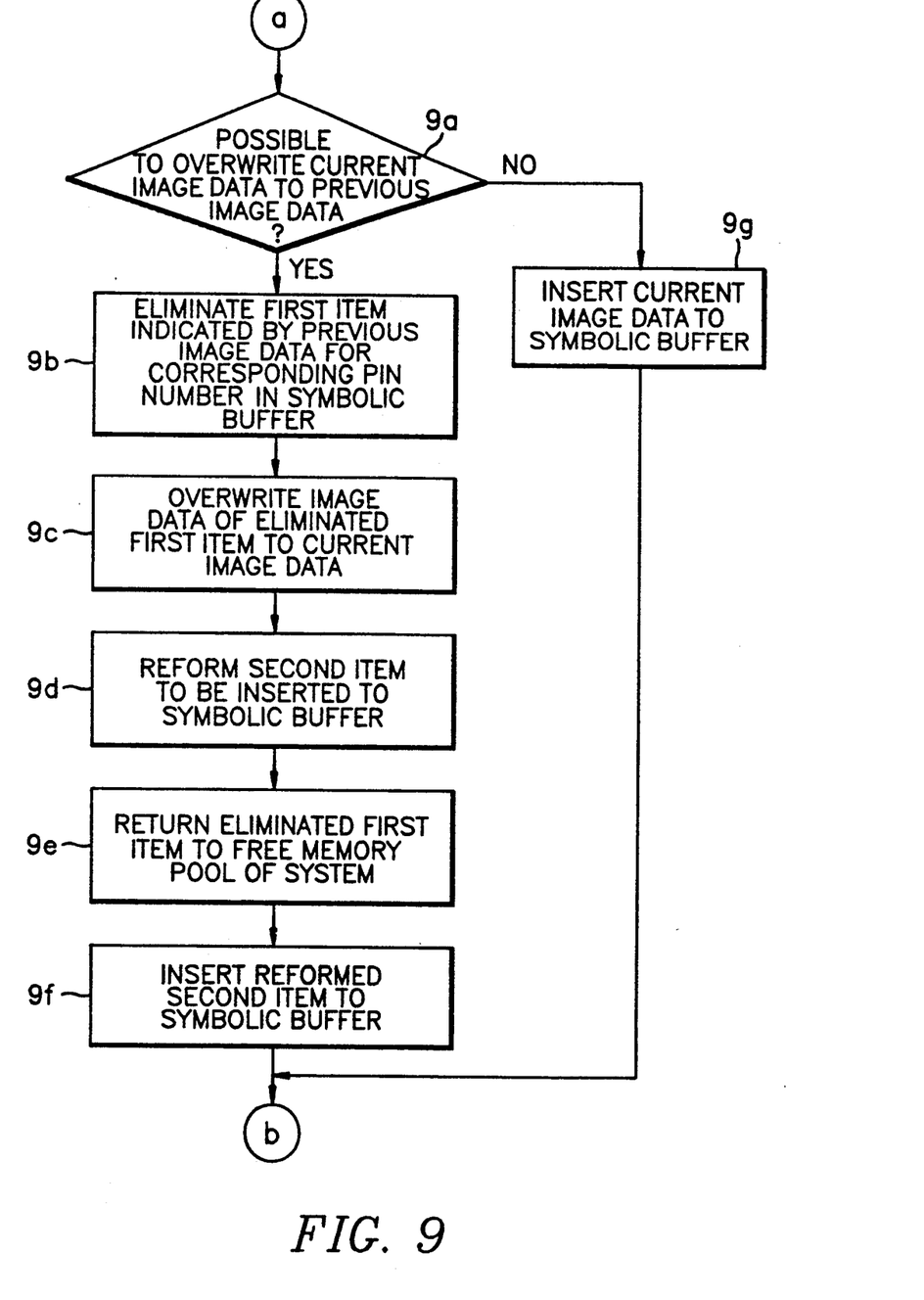
FIG. 9 is a flow chart of a series of steps for processing image data overwriting of FIG. 8.
Figure 10A:
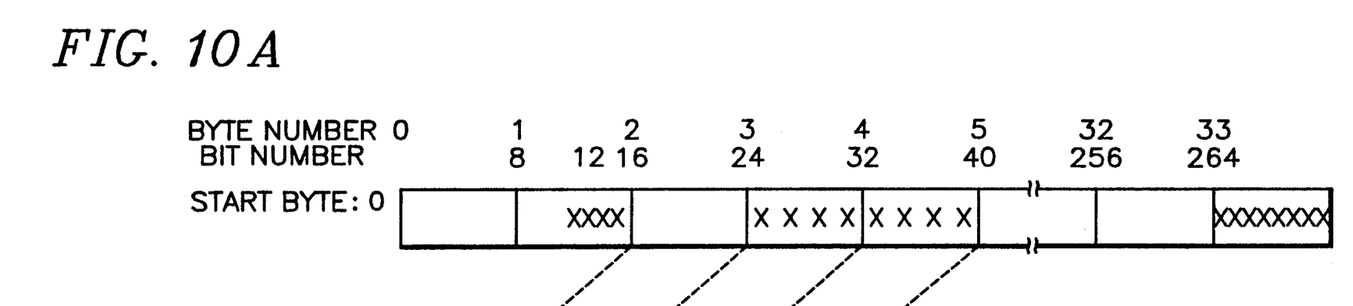
FIG. 10A to 10C show an example for appending image data during overwriting of FIG. 9.
Figure 10B:
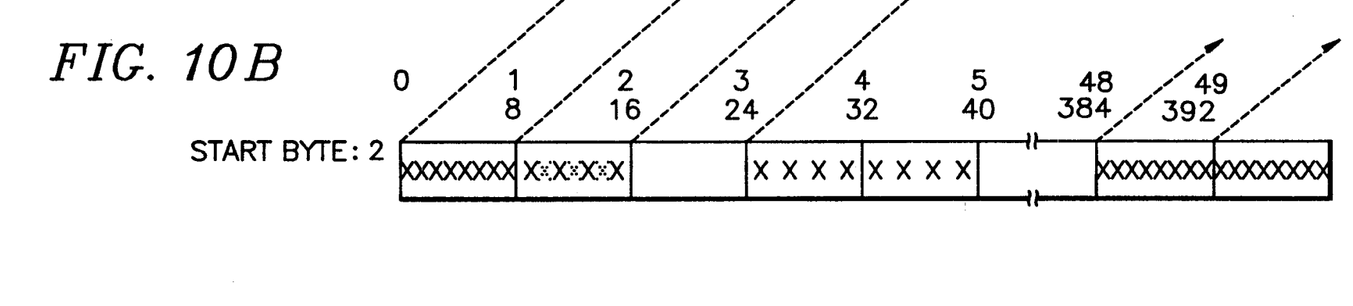
Figure 10C:
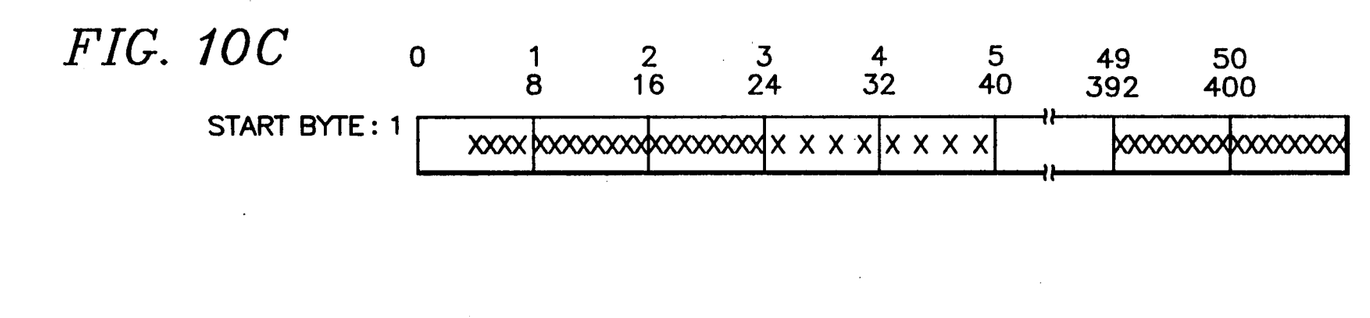

Referring to FIG. 9, in step 9a, whether or not the current image data can be overwritten to the previous image data is checked by checking DPI of the saved image data. If it can be overwritten, an item stored to the symbolic buffer of FIG. 4 is eliminated, in step 9b, by the use of the previous image data (the eliminated item is called a first item). In this case, the first item is eliminated only from the symbolic buffer and remains in the memory. Moreover, the eliminating method is the same with that for eliminating an item from the linked list. In step 9c, the image data of the eliminated item and the current image data are overwritten as shown in FIGS. 10A to 10C. FIG. 10A to 10C show examples of the current image data, the previous image data and overwritten image data, respectively. In FIG. 10A to 10C, X indicates a dot. In step 9d, a second item to be inserted to the symbolic buffer is formed through a re-designating process of various parameters for the image data obtained by step 9c. In the case of 300 DPI page printer, since 150 DPI image data is compressed by one-half times, the start position of an X axis of the current image data and the previous image data coincides with the bit position corresponding to one-half the start position in actual image data. When these image data are overwritten, the image data shown in FIG. 10C is obtained and the start position of an X axis of the overwritten image data is determined by a small value between the start positions of two image data. Further, the width is determined by the difference between the large byte value out of the final positions of two image data and the byte value of the start position of the overwritten image data. In step 9e, a release process for returning the previous image data to a free memory pool of the system is performed. In step 9f, the second item is again inserted to the symbolic buffer. Meanwhile, in step 9a, if the current image data and the previous image data can not be overwritten, the current image data is inserted, in step 9g, to the symbolic buffer.

As described above, the dot matrix printing emulation method in the page printer adopting the band buffering system can shorten the processing time and save the memory space by effectively achieving overwriting, space fill-in, etc. usually used in the dot matrix printer.

The foregoing description shows only a preferred embodiment of the present invention. Various modifications are apparent to those skilled in the art without departing from the spirit and scope of the present invention which is only limited by the appended claims. Therefore, the embodiment shown and described is only illustrative, not restrictive.

I claim:

1. A graphic processing method in a dot matrix printer, comprising the steps of:
   (a) comparing a previous graphic mode and a previous position value of an image data with a current graphic mode and a current position value of an image data, respectively;
   (b) if the previous and current graphic modes and position values are identical to each other, setting an overwrite flag to on, and if the previous and current position values are not identical to each other and a value obtained by subtracting the previous position value from the current position value is within a space fill-in region, performing space fill-in;
   (c) replacing the current position value to the previous position value when said value is not within the space fill-in region or the space fill-in process is ended, and initializing a pin number; and
   (d) generating an image data with respect to a corresponding pin, checking said overwrite flag is set to on, overwriting a current image data to a previous image data of corresponding pin number when said overwrite flag is set to on, and inserting the current image data to the symbolic buffer when said overwrite flag is not set to on.

2. A graphic processing method in a dot matrix printer as claimed in claim 1, wherein said step (d) further comprising the steps of:
   checking if said image data can be overwritten to the previous image data, inserting the current image data buffer to the symbolic buffer when said image data can not be overwritten, and removing an item indicated by the previous image data of a corresponding pin number from the symbolic buffer when said image data can be overwritten;
   overwriting the image data of the removed item to the current image data and re-forming an item to be inserted to the symbolic buffer; and
   returning the removed item to a free memory pool and inserting the re-formed item to the symbolic buffer.

* * * * *

UNITED STATES PATENT AND TRADEMARK OFFICE
CERTIFICATE OF CORRECTION

PATENT NO. : 5,325,469
DATED : June 28, 1994
INVENTOR(S) : Ji-Ho Ro

It is certified that error appears in the above-indentified patent and that said Letters Patent is hereby corrected as shown below:

On the title page Insert

--(73) Assignee: SamSung Electronics Co., Ltd.
Suwon, Kyungki-do, Republic of Korea--.

--Attorney, Agent or Firm: Robert E. Bushnell--.

Signed and Sealed this

Twenty-third Day of August, 1994

Attest:

BRUCE LEHMAN

Attesting Officer

Commissioner of Patents and Trademarks